US006868277B1

(12) United States Patent
Cerwall et al.

(10) Patent No.: US 6,868,277 B1
(45) Date of Patent: Mar. 15, 2005

(54) MOBILE RADIO SYSTEM AND A METHOD FOR CHANNEL ALLOCATION IN A RADIO SYSTEM

(75) Inventors: Patric Cerwall, Guilford (GB); Erik Westerberg, Enskede (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/504,928

(22) Filed: Feb. 16, 2000

(30) Foreign Application Priority Data

Feb. 22, 1999 (SE) .............................................. 9900618

(51) Int. Cl.[7] ................................................ H09Q 7/00
(52) U.S. Cl. ........................ 455/509; 455/62; 455/63.1; 370/329
(58) Field of Search ................................ 455/423–425, 455/434, 450, 451–453, 464, 509, 510, 63.1, 67.1, 507, 512–513, 62; 370/443, 468, 329, 282, 226, 277, 310, 328, 331–333

(56) References Cited

U.S. PATENT DOCUMENTS

| | | | | |
|---|---|---|---|---|
| 5,093,924 A | * | 3/1992 | Toshiyuki et al. | 455/450 |
| 5,375,123 A | | 12/1994 | Andersson et al. | |
| 5,491,837 A | | 2/1996 | Haartsen | |
| 5,530,917 A | | 6/1996 | Andersson et al. | |
| 5,740,537 A | * | 4/1998 | Beming et al. | 455/450 |
| 5,886,988 A | * | 3/1999 | Yun et al. | 370/329 |
| 5,898,928 A | * | 4/1999 | Karlsson et al. | 455/450 |
| 6,005,852 A | * | 12/1999 | Kokko et al. | 370/329 |
| 6,061,339 A | * | 5/2000 | Nieczyporowicz et al. | 370/335 |
| 6,137,991 A | * | 10/2000 | Isaksson | 455/67.11 |
| 6,201,971 B1 | * | 3/2001 | Purnadi et al. | 455/450 |
| 6,317,612 B1 | * | 11/2001 | Farsakh | 455/67.11 |
| 6,418,317 B1 | * | 7/2002 | Cuffaro et al. | 455/450 |
| 6,434,164 B1 | * | 8/2002 | Matsunaga et al. | 370/443 |
| 6,498,934 B1 | * | 12/2002 | Muller | 455/450 |
| 6,519,462 B1 | * | 2/2003 | Lu et al. | 455/453 |
| 6,650,876 B1 | * | 11/2003 | Ostman et al. | 455/103 |

FOREIGN PATENT DOCUMENTS

| | | | | |
|---|---|---|---|---|
| SE | WO 97/32444 | 9/1997 | | |
| WO | WO 9701941 A1 | * | 1/1997 | ............ H04Q/7/34 |
| WO | WO 98/27763 | 6/1998 | | |
| WO | WO 98/36600 | 8/1998 | | |
| WO | WO 98/30047 | 9/1998 | | |
| WO | WO 0051390 A1 | * | 8/2000 | ............ H04Q/7/38 |
| WO | WO0141376 A2 | * | 6/2001 | ........... H04L/12/56 |

OTHER PUBLICATIONS

In-service link quality estimation for link adaptation algorithms, applied to GSM, J. Pons et al., IEEE Xplore, International Conference on Universal Person Communications, vol. 2, Oct. 1998, pp. 1169–1173.

IEEE Personal Communications, Jun. 1996, vol. 3, No. 3, Dynamic Channel Assignment and Signaling, pp. 1–31.

* cited by examiner

*Primary Examiner*—Pablo N. Tran
(74) *Attorney, Agent, or Firm*—Nixon & Vanderhye P.C.

(57) ABSTRACT

The present invention relates generally to a method for determining which radio channel to allocate to a mobile station for communicating via a mobile radio system, and a system for mobile radio communication in which a radio channel can be allocated to a mobile station. More particularly, the invention relates to a system and method for radio channel allocation where the radio quality on candidate radio channels is measured and the interference effects of establishing a radio connection on the candidate radio channels on already existing radio connections is estimated. Using these measurement results and estimates, as well as the information about the quality requested by the connection to be set up, it is determined which radio channel (if any) shall be allocated to the MS.

18 Claims, 7 Drawing Sheets

Call record register 400

| 1. list of candidate channels | 2. channel quality (100%) | 3. fraction of channel needed | 4. fraction available | 5. Impact on existing channels | 6. Channel allowed or not |
|---|---|---|---|---|---|

(i)

| | | | | | |
|---|---|---|---|---|---|
| Cell A, channel 2 | | | | | |
| Cell A, channel 3 | | | | | |
| Cell A, channel 5 | | | | | |
| Cell A, channel 8 | | | | | |
| Cell B, channel 1 | | | | | |
| Cell B, channel 2 | | | | | |
| Cell B, channel 3 | | | | | |
| Cell C, channel 1 | | | | | |

(ii)

| | | | | | |
|---|---|---|---|---|---|
| Cell A, channel 2 | 20 kbps | 0.2 | | | |
| Cell A, channel 3 | 16 kbps | 0.25 | | | |
| Cell A, channel 5 | 16 kbps | 0.25 | | | |
| Cell A, channel 8 | 4 kbps | 1.0 | | | |
| Cell B, channel 1 | 2 kbps | 2.0 | | | |
| Cell B, channel 2 | 6 kbps | 0.67 | | | |
| Cell B, channel 3 | 4 kbps | 1.0 | | | |
| Cell C, channel 1 | 0 kbps | infinity | | | |

(iii)

| | | | | | |
|---|---|---|---|---|---|
| Cell A, channel 2 | 20 kbps | 0.2 | 0.1 | | Ass. Not All. |
| Cell A, channel 3 | 16 kbps | 0.25 | 0.4 | | |
| Cell A, channel 5 | 16 kbps | 0.25 | 0.5 | | |
| Cell A, channel 8 | 4 kbps | 1.0 | 0.5 | | Ass. Not All. |
| Cell B, channel 1 | 2 kbps | 2.0 | 1.0 | | Ass. Not All. |
| Cell B, channel 2 | 6 kbps | 0.67 | 1.0 | | |
| Cell B, channel 3 | 4 kbps | 1.0 | 0.5 | | Ass. Not All. |
| Cell C, channel 1 | 0 kpbs | infinity | 0.33 | | Ass. Not All. |

(iv)

| | | | | | |
|---|---|---|---|---|---|
| Cell A, channel 2 | 20 kbps | 0.2 | 0.1 | - | Ass. Not All. |
| Cell A, channel 3 | 16 kbps | 0.25 | 0.4 | Acceptable | |
| Cell A, channel 5 | 16 kbps | 0.25 | 0.5 | Not Acc. | Ass. Not All. |
| Cell A, channel 8 | 4 kbps | 1.0 | 0.5 | - | Ass. Not All. |
| Cell B, channel 1 | 2 kbps | 2.0 | 1.0 | - | Ass. Not All. |
| Cell B, channel 2 | 6 kbps | 0.67 | 1.0 | Acceptable | |
| Cell B, channel 3 | 4 kbps | 1.0 | 0.5 | - | Ass. Not All. |
| Cell C, channel 1 | 0 kpbs | infinity | 0.33 | - | Ass. Not All. |

Fig. 4 (c)

MOBILE RADIO SYSTEM AND A METHOD FOR CHANNEL ALLOCATION IN A RADIO SYSTEM

FIELD OF THE INVENTION

The present invention relates generally to the field of mobile radio communications and more specifically to a method and apparatus for allocating radio channels to users in a mobile radio system.

BACKGROUND

As the load on the existing mobile radio systems is continuously increasing, it becomes more and more important to efficiently utilize the scarce frequency resources. A lot of effort is today put into planning the mobile radio cell structure, in order to optimize, given a certain amount of bandwidth, the number of connections with acceptable channel quality. How the available channels are allocated to existing and about-to-be-set-up radio connections is of uttermost importance for the overall performance of the system. Various methods for channel allocation are described in the publication "*Channel assignment schemes for cellular mobile telecommunication systems: A comprehensive survey*", IEEE Personal Communications, June 1996, I. Katzela and M. Naghshineh.

An important group of channel allocation schemes are the schemes which base the channel allocation decision on measurements of the co-channel interference which would be experienced by a candidate channel if a connection were to be set up on the channel. However, decisions based upon such interference measurements only can lead to sub-optimal allocation. It is possible that allocation of a channel with low co-channel interference will result in a negative impact on already existing calls in the network, and hence in deterioration of the quality of such calls. Such deterioration will often lead to disturbing hand-overs of the deteriorated calls to other radio channels, which may in turn lead to further existing connections being adversely affected.

Attempts to address the problem of avoiding unwanted impact on already existing connections when allocating a new channel to a connection can be found in the literature. In WO97/32444, a method for allocating a frequency to a cell is described, where one criteria for selecting a certain frequency is that the frequency to be selected cannot cause third order intermodulation products when combined with any of the selected frequencies being used in that cell. However, the impact on existing radio connections of setting up a new radio connection extends far beyond the impact of third order intermodulation products on existing connections in the cell where the new connection is to be set up. A very important effect to consider is the impact of co-channel and adjacent channel interference, which is mainly to be taken in account of for channels used in cells other than the cell where the connection is to be set up. In U.S. Pat. No. 5,491,837 a method for frequency allocation is described where the frequency is selected which requires the lowest transmit power to obtain a certain carrier over interference (C/I) value. A set-up transmit power threshold is used in the method, which prevents users that would need a lot of power, and would therefore produce a high level of interference, from entering the system. This is a rather crude way of solving the problem, since no threshold value would be the optimal threshold value for all frequencies at all moments. Thus, the available channels cannot be utilized in an efficient way using this method.

It would therefore be very advantageous if a method of predicting the interference impact of the set up of a new connection on already existing connections could be found. An object of the present invention is to provide such a method.

SUMMARY

One object of the present invention is to increase the performance of a mobile radio system by minimizing the disturbing interference on the radio connections in the system.

Another object of the invention is to facilitate for utilizing the available radio channels in a more efficient way.

A further object of the invention is to reduce the number of hand-overs performed by the system.

According to the invention, this has been solved by a method of determining a radio channel for a mobile station for communicating via a service in a mobile radio system in which some of the available radio channels are already in use for existing radio connections. The method comprises the steps of selecting candidate radio channel(s), measuring the quality of the candidate radio channel(s), estimating the interference effects on the existing radio connections of establishing a radio connection on the candidate radio channel(s) and determining, based on the results obtained in the steps of measuring and estimating, one of the candidate channels for communication.

The objects of the invention are further met by a system for mobile radio communication, or more simply a mobile radio system, having a plurality of radio channels of which some are in use for existing radio connections, where the radio channels not in use are radio channels available for allocation to a mobile station for communication in the mobile radio system, the mobile station being capable of measuring the radio quality of radio channels. The system comprises radio resource administrating means for keeping a list of candidate radio channels for the allocation and for determining the radio channel to be allocated, interference supervising means for estimating the impact a radio connection on a certain candidate radio channel would have on existing radio connections and means for exchanging information between the mobile station and the radio resource administrating means.

By the method and the system of the invention is achieved that the quality to be expected of a connection to be set-up on a certain radio channel is known before the set-up is actually performed, as well as the interference impact the set-up of a new connection will have on already existing connections. Thus, by using this knowledge as a basis for determining which radio channel to allocate to a radio connection to be set-up, an increased performance of all the radio connections in the mobile radio system is achieved, since regardless of cell plan, non-acceptable interference from a new connection on already existing connections is avoided. Furthermore, a reduction of the risk of having to perform immediate hand-overs of the connection-to-be or of other existing radio connections is achieved.

According to one aspect of the present invention, the system for mobile radio communication further comprises a session quality supervising means, coupled to the radio resource administration means 300, for supervising the radio quality of the existing radio connections. Hereby is achieved that information about the quality demands of the of the existing radio connections can always be obtained, as well as information about how these demands are presently being met.

According to one aspect of the present invention, the step of estimating the interference effects on the existing radio connections of establishing a radio connection on the candidate radio channel further comprises the step of measuring the path loss between one of base transceiver stations of the system and a base transceiver station radio coverage area corresponding to another one of the base transceiver stations of the system. In another aspect of the invention, the step of estimating could be performed by using a cell-to-cell interdependency matrix.

According to one aspect of the invention, the step of measuring the quality of the candidate radio channel(s) could comprise the step of analyzing soft values in the mobile station equalizer. The mobile station could then be adapted to measuring the radio quality of radio channels by analyzing soft values in the mobile station equalizer. According to another aspect of the invention, the step of measuring the quality could comprise the steps of measuring the interference during idle time slots and measuring the carrier signal strength during active time slots. The mobile station could then be adapted to measuring the radio quality of radio channels by measuring the interference during idle time slots and measuring the carrier signal strength during active time slots.

In one aspect of the invention, a comparison is made between the results obtained in the quality measurements of the candidate radio channel(s) and a quality requested by the service, and the results of this comparison is further used as a basis for the determination of a radio channel for communication. Hereby is achieved that a quality selective use of the radio resources can be applied. For example can radio channels which cannot match the requirements of a high quality demanding service still be used for services which require a less high quality, without risking having a high quality demanding service having to experience the lower quality. Furthermore, in order to minimize the impact on the present and future performance of the system, a radio channel with sufficient, but not necessarily the best, quality can be allocated to the connection to be setup.

In another aspect of the invention, the mobile radio system comprises at least two mobile radio networks each having a plurality of radio channels. The candidate radio channels are then selected from the radio channels of the at least two mobile radio networks. Hereby is achieved that the flexibility and performance of the mobile radio system is increased. In case of poor quality in one of the radio networks, the radio channels of another radio network can be used for communication.

BRIEF DESCRIPTION OF THE DRAWINGS

The present invention will now be discussed in more detail with reference to preferred embodiments of the present invention, given only by way of example, and illustrated in the accompanying drawings, in which:

FIG. 4(*a*) is an overview sequence diagram illustrating the flow of messages between various devices of the system during the operation of the method in one embodiment of the present invention.

FIG. 4(*b*) illustrates how a call record register in the radio resource administrator in FIG. 3 is filled out as the flow of messages in FIG. 4(*a*) proceeds.

FIG. 4(*c*) is a schematic flow chart illustrating the activities in the radio resource administrator shown in FIG. 3 as the flow of messages in FIG. 4(*a*) proceeds.

DETAILED DESCRIPTION

Figure 1:
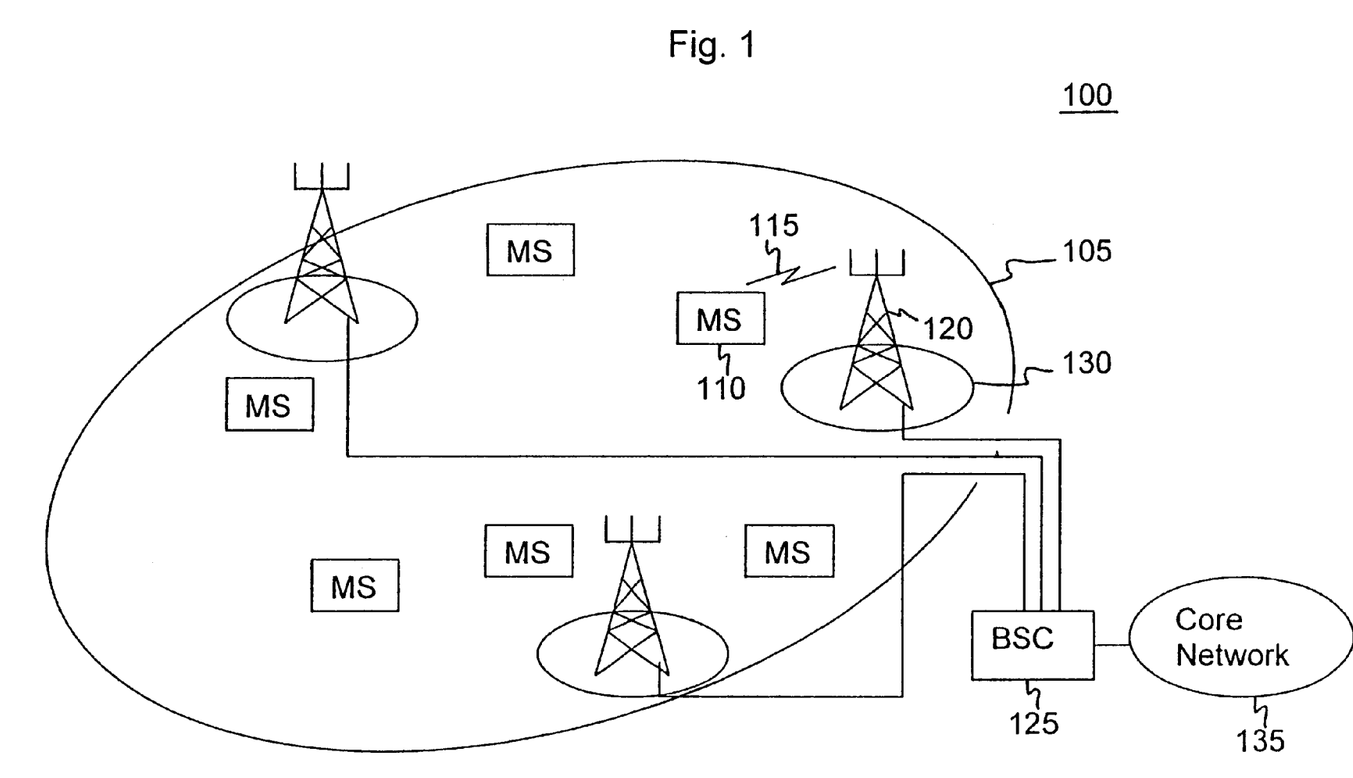
FIG. 1 schematically illustrates a cellular radio network comprising mobile stations, base transceiver stations, a base station controller and a core network.

The general architecture of a mobile radio network 100 is schematically illustrated in FIG. 1. Mobile radio network 100 provides radio communication to users of Mobile Stations (MS) within a limited geographical region known as the coverage area 105 of the mobile radio network 100. Several Mobile Stations (MS) can be situated within the coverage area 105 of the mobile radio network 100. In FIG. 1, MS 110 is shown to communicate within the mobile radio network via a Base Transceiver Station (BTS) 120 using a radio link 1115. Several BTSs belonging to the mobile radio network may be connected together via a Base Station Controller (BSC) 125. Each BTS has its own radio coverage area 130 which may be partially overlapping with the coverage areas of neighbouring BTSs. The BSC 125 is in turn connected to a core network 135 which controls calls to and from other networks such as Public Switched Telephony Networks (PSTN), Integrated Services Digital Networks (ISDN), other Public Land Mobile Networks (PLMNs), the Internet etc.

The geographical area within which a BTS 120 takes radio traffic is called the cell of the BTS. The cell is not a static area, but its borders will vary with time, depending on the activities of the surrounding BTSs. In a Time Division Multiple Access (TDMA) system such as the ETSI standard for circuit switched mobile communication, Global System for Mobile Communications (GSM), or the ETSI standard for mobile packet data communication, General Packet Radio Service (GPRS), each BTS transmits on several separated radio frequencies.

To each BTS frequency (downlink frequency) there is a corresponding frequency which is used by the MS (uplink frequency). Each frequency is divided into several time slots which can be used by different MSs. One such time slot is referred to as a physical channel, and the information received on a time slot is referred to as a burst. For some services, such as GPRS or High Speed Circuit Switched Data (HSCSD), a MS can use more than one physical channel for a single connection, or fractions of a physical channel. In the following description, a radio connection is said to utilize a radio channel, meaning any number of time slots on the same carrier frequency in a TDMA system. Other services which the mobile radio network may provide could be different speech services, normal speed circuit switched data, positioning services, short message services (SMS) etc.

As mentioned briefly above, a MS 110 is normally within the radio coverage area 130 of several BTSs 120. Logic which is used for determining to which downlink channel a MS should listen when in active mode may be contained in the BSC 125. The MS 110 continually makes measurements, in both idle and active mode, on the surrounding BTSs' signals. In idle mode, the MS 110 uses the measurement results to decide which channel to camp on according to known technique. In active mode, and in case of a call set-up, the measurement results are sent on a control channel to the BSC 125, which uses the results in the determination process. Since there is not necessarily a simple connection between the strength of a signal and the corresponding quality the signal would provide a user, the signal quality may be measured as well as the signal strength. The quality measurement can be performed in a number of different ways, some of which are described below.

When a radio channel is allocated to a MS 110, some of the already ongoing radio connections in the mobile radio network 110 will inevitably be affected. Some connections maintained by other BTSs will be disturbed by the interference effects of the allocated radio signal. Connections on the same radio carrier as the allocated channel, especially in a packet data service such as GPRS, will be affected, since there will be less available bandwidth for each connection. Allocating a radio resource will also influence the freedom of action of the system within the near future. For example, in a European GSM network, if a radio channel within the 900 MHz frequency band is allocated to a dual mode terminal which can transmit also in the 1800 MHz frequency band, even when there are 1800 MHz channels available, there will be less possibility to serve single mode terminals which can only transmit in the 900 MHz band.

Figure 2:
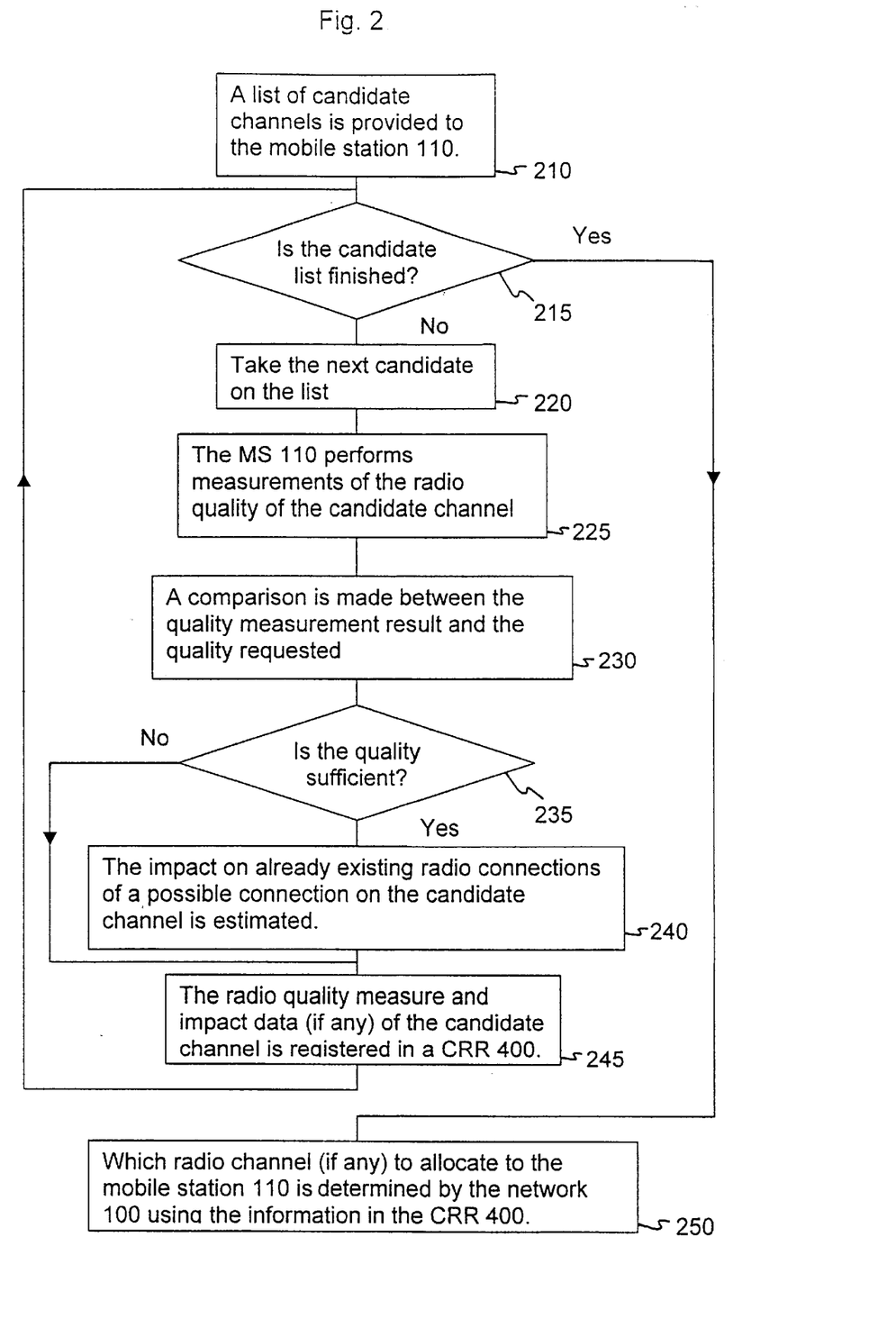
FIG. 2 schematically illustrates a flow diagram of a method used for allocating radio channels to the mobile stations in FIG. 1.

To achieve the best over all performance of the cellular system, such negative influence on on-going traffic and future possibilities could be considered when making the decision about which resource to allocate to a mobile station 110, as well as the radio-quality-to-be on the channel to be allocated. An example of the concept of the method of the invention is shown in FIG. 2. The method described in the flow chart in FIG. 2 could be used either for assignment of a channel for a new radio connection during call set-up, or used repeatedly for continuous quality update of already existing connections with a possible hand-over in mind, so called locating. In case of assignment of channel for a new radio connection, the request for such a channel could be made either by the MS 110 or by the core network 135.

In step 210 of FIG. 2, a list of candidate radio channels is provided to the MS 110. This list could be acquired by referring to mobile held information (e.g. frequency lists in a GSM mobile), or sent to MS 110 by the mobile radio network, which could select the candidate channels depending on, e.g., the geographical position of the MS 110, the properties of the MS 110 and the load on the nearby BTSs 120. For example, if a candidate GPRS radio channel cannot provide a gross bandwidth (i.e. bandwidth including bandwidth used for so called link adaption, where control bits used for error detection are included in the transmitted information) larger than the net bandwidth (i.e. information carrying bandwidth) needed for the requested service, this channel could be excluded from the list already at this stage. The list could typically contain 3–6 different candidate channels. Too many candidate channels would overload the processing capacity of the MS 110, and too few candidates lowers the probability of finding the most suitable channel. If the method is used for locating, the presently serving radio channel could be included in the candidate list.

In an embodiment of the invention shown in FIG. 2, all investigation steps are performed for a candidate channel before the investigation of the next candidate channel in the list is started. One could also choose to perform one of the investigation steps of FIG. 2 repeatedly for all candidate channels before the next step is entered.

In step 215 of FIG. 2, it is checked whether there are any candidate channels on the list that have not yet been investigated, or if the list is finished. If the list is not finished, then the next channel in the list is chosen in step 220. In step 225, the MS 110 performs measurements of the radio quality of the candidate channels according to a quality measurement scheme of which examples will be given below. The measurement result may then be sent to the mobile radio network 100. In step 230, the mobile radio network 100 makes a comparison between the estimated quality of a possible connection and the quality needed for the requested service. In this step, information about what fraction of the candidate channel can be set aside for the requested service without lowering the quality of the existing connections on the same carrier below what is acceptable may also be taken into the consideration, when appropriate. Another possibility is to provide the MS 110 with information about the requested quality and let the MS 110 make the comparison in step 230. In step 235, it is determined whether the measured quality would be sufficient for the requested service. If not, step 245 is entered, where the quality measurement result is entered into a Call Record Register (CRR) 400. If the result of the comparison in step 235 is that the quality would be sufficient, then step 240 is entered.

In step 240, the impact of the interference effects of a radio connection on the candidate channels on already existing connections in other cells is estimated. Such impact is mainly caused by interference effects on connections using the same frequency. The interference estimation can be made in several different ways, of which the easiest is to study a topographical map and compare it with the cell plan. A more sophisticated method, and also more accurate, is to use a cell-to-cell interdependency matrix, a method which is described in more detail below. When step 240 is completed, step 245 is entered and the results of the quality measurement and the impact estimation are registered into the CRR 400.

In step 250, the information gathered in the proceeding steps is used in order to determine which radio channel, if any, shall be allocated to the MS 110. Considerations made are e.g. that the allocated channel should provide the MS 110 with sufficient radio quality and information carrying capacity for the requested service and the impact of the new connection should not reduce the quality of any of the existing connections below what is acceptable. Using resources which are better than what is necessary could also be avoided, e.g. by not utilizing the best quality channel to a speech connection if there are other channels which would give sufficient quality, since the quality of the speech connection will not benefit from a radio link quality which is better than necessary. Hence the best quality channel could be saved for a near-future request for a data connection. In step 250, the decision may be that there is no suitable channel in the list to allocate to the MS 110. Another list could then be provided to the MS and the procedure of FIG. 2 could be repeated, or the MS 110 could be refused access to the mobile radio network. Depending on the priority of the requested service compared to the already existing connections, the decision could also be to close one of the existing connections in favor of MS 110.

The steps presented in FIG. 2 do not have to be performed in the exact order presented in the figure. As mentioned above, performing one step for all candidate channels at a time instead of all steps for one candidate would be a possible embodiment. Further, the registration step 245 could partly be performed after the quality measurement step 225, partly after the comparison step 235 and partly after the impact estimation step 245. One could also perform the impact estimation step 240 before the quality measurement step 225, etc.

The interference estimates made in step 240 of FIG. 2 can e.g. be performed by using a cell-to-cell interdependency matrix. The method of setting up such a matrix is described in the pending U.S. patent application Ser. No. 08/940,648 entitled "Estimating Downlink Interference in a Cellular Communications System", corresponding to WO98/27763, hereby incorporated by reference in its entirety. In the method, all MSs in the cellular system regularly measures the perceived strength of the signals of the surrounding BTSs. The perceived signal strengths from a certain BTS 120 is then compared to the power transmitted by the same BTS, in order to obtain the path loss between the BTS and the position of the measuring MS. The measured path loss is then a measure of the interference correlation between the two positions. In a GSM embodiment disclosed in the patent application, the network sends a modified BA list (Broadcast control channel Allocation list) to the MSs, instructing the MSs of which Broadcast Control CHannels (BCCH) to measure on. Each BTS is continually transmitting on its BCCH, among other things broadcasting its unique Base Station Identity Code (BSIC) in order to identify itself to the MSs. The measured BCCH signal strengths together with the corresponding BSICs are then reported to the network, which compares the perceived signal strengths with the power actually emitted by the different BTSs, in order to calculate the path loss between a BTS and the cell within which the reporting MS is located. A cell-to-cell interdependency matrix containing all the cells of the system is continuously updated with the reported values and thus describes the cell-to-cell interference dependencies. Since there are normally several MSs in each cell, the statistical basis for the calculation is reasonably good. In this way, an estimate of how much a certain BTS interferes in different cells can be obtained, and hence the downlink carrier to interference (C/I) and carrier to adjacent channel (C/A) can be derived. The signal strength measurement mentioned above could also be performed by devices other than the regular MSs, e.g. by specially devoted measurement devices.

A possible method for quality measurements according to step 225 of FIG. 2 is for the MS 110 to measure the interference level I during time slots when the BTS is not transmitting, so called idle time slots. For the serving BTS, the MS knows when these time slots occur and by measuring the received signal strength on these time slots, a measure of the interference is obtained. Measurements on any other time slots yield the carrier signal strength, C. These measurements can be performed on serving channel or on any other channel which the serving BTS transmits on. By listening to the BCCH (Broadcast Control Channel) or the PBCCH (Packet Broadcast Control Channel) of another BTS than the serving BTS, the MS can read the synchronization of the BTS, and hence the information about when this BTS will be idle. Alternatively, information about the synchronization of another BTS can be sent by the serving BTS on a control channel. By tuning, in time for such an idle time slot, the frequency on which to measure the signal strength to a frequency transmitted by the particular BTS, a MS can measure the interference the MS would perceive if served by this particular frequency. By measuring the signal strength on any other time slot, the MS can determine the carrier strength, C, it would perceive. The carrier over interference value, C/I, is then a measure of the signal quality the MS would get. In packet data applications, there is a simple relation between C/I and net bandwidth, since the better the signal quality, the less gross bandwidth has to be used for link adaption. This method for measuring the signal quality on serving and other BTSs is particularly suitable for GPRS, since it is standardized that on a GPRS frequency, every $26^{th}$ time slot should be idle (see GSM TS 03.60). In GSM, the standardized idle time slots occur more seldom. Other examples of quality measurement methods could be to measure the Frame Erasure Rate (FER), i.e. the fraction of damaged speech frames in a speech connection or the Bit Error Rate (BER), i.e. the relative number of bits that were wrongly detected.

Another possible way of performing the radio quality measurements in step 225 of FIG. 2 is to use the soft information in the equalizer, a method described in "In-service link quality estimation for link adaptation algorithms, applied to GSM", J. Pons and J. Dunlop, IEEE International Conference on Universal Person Communications '98, which is hereby incorporated by reference. The soft information in the equalizer is a measure of the difference between the probable sent bit sequence assumed by the equalizer when distorted in the transmission channel model used by the equalizer and the bit sequence actually received by the receiver. The information can be obtained for each bit, and is then referred to as the soft value. This soft value is the squared magnitude of the difference between the two signals, and in order to allow a quantized soft value, the variation of the energy from burst to burst can be compensated for by normalizing the squared magnitude by a noise estimate extracted from the training sequence. By way of example, an average of the soft value of the bits in a burst, referred to as the soft output average, may then be used as a measure of the quality of the radio channel.

This method of estimating the quality of a radio channel can successfully be used in all radio systems using an equalizer, although it requires sufficient processing capacity of the MS. An advantage of the method is that it can be used on any time slot, except the idle ones. Another advantage is that analyzing only one burst gives a sufficiently good estimate of the quality, i.e. the method is very fast, although a better estimate is obtained if an average over several time slots is performed.

Figure 3:
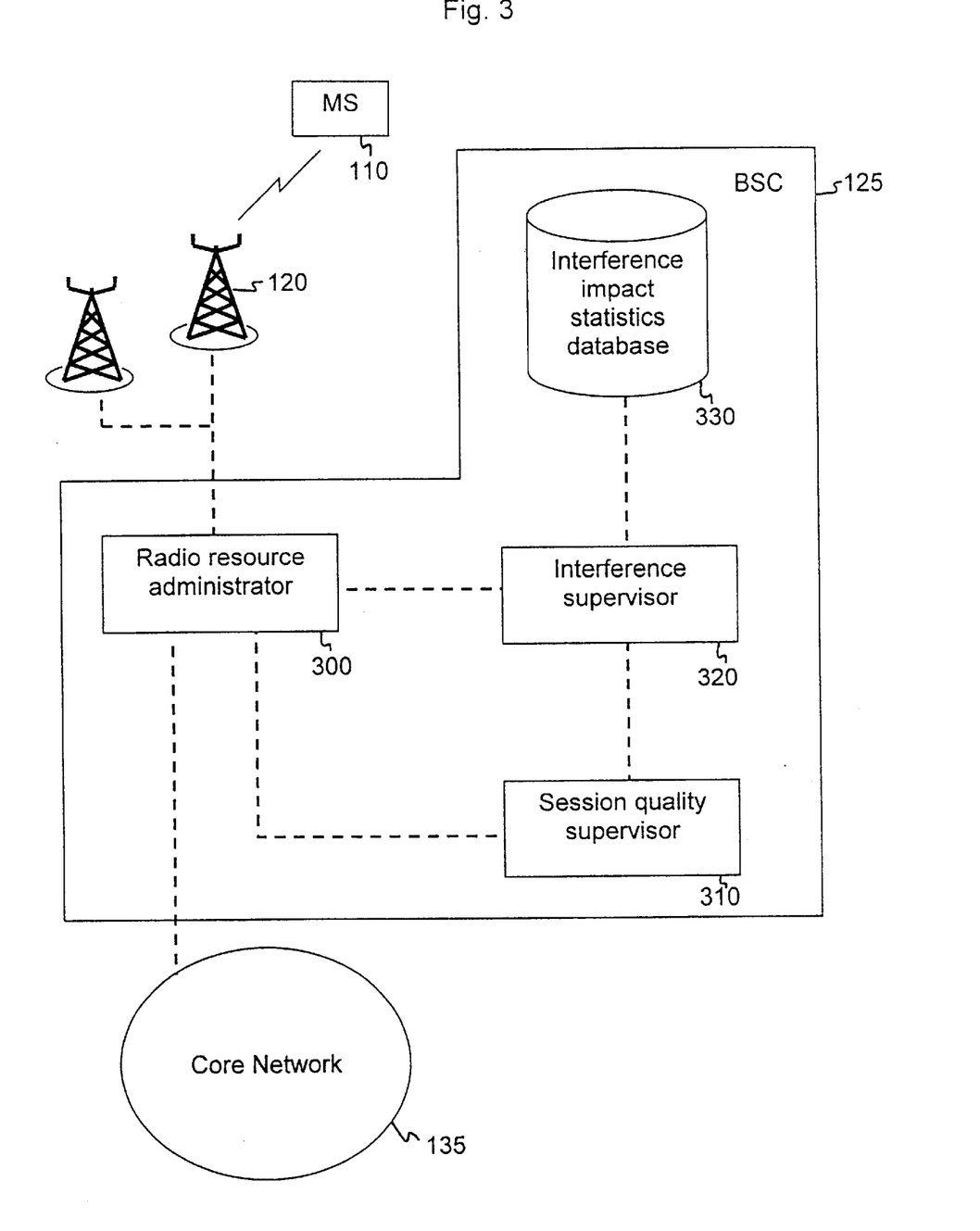
FIG. 3 is a block schematic illustrating a base station controller, connected to a mobile station via a base transceiver station and to a core network, comprising a radio resource administrator, a session quality supervisor, an interference supervisor and an interference impact statistical database according to one embodiment of the present invention.

An exemplary mobile radio network architecture of the present invention is shown in FIG. 3. A MS 110 communicates with the mobile radio network via one of the BTSs 120 of the mobile radio network. The BTSs 120 are in the exemplary embodiment connected to a radio resource administrator 300, which is in turn connected to the core network 135. The radio resource administrator 300 is further connected to a session quality supervisor 310 and an interference supervisor 320. The interference supervisor 320 is further connected to an interference impact statistical database 330 as well as to the session quality supervisor 310. In an exemplary embodiment the radio resource administrator 300, the session quality supervisor 310, the interference supervisor 320 and the interference impact statistical database 330 are all located in the BSC 125. However, it is possible to locate one or several of these devices in a different part of the mobile radio network.

The radio resource administrator 300 is in the exemplary embodiment the device of the mobile radio network 100 which is responsible for the allocation of radio resources to the MS 110. The radio resource administrator 300 is responsible for keeping the list of candidate channels, which can either be selected by the radio resource administrator 300 or by the MS 110 or elsewhere, as well as for receiving the quality measurement results on these channels from the MS 110. By interrogating the session quality supervisor 310 and the interference supervisor 320, the radio resource administrator 300 may gather information on which the decision is made on which channel, if any, to allocate to the MS 110. In the case of having received a request for a channel allocation for a new radio connection, the radio resource administrator 300 sends an order to the MS 110 to perform an assignment on the selected channel, or, in case of a hand-over, the radio resource administrator 300 sends an order to the MS 110 to re-assign to the selected channel. Once a connection is set up, the radio resource administrator 300 may continually update the list over candidate channels and receive measurement information on the grounds on which hand-over decisions are made, in order to continually obtain an optimal allocation of resources.

In the exemplary embodiment, one of the tasks of the interference supervisor 320 is to estimate the impact the set-up of a connection would have on already existing connections. In order to do so, the interference supervisor 320 can interrogate the interference impact statistics database 330, which stores information on interference correlation between radio channels of the system. The interference impact statistical database 330 can hence provide the interference supervisor 320 with information on in which cells the candidate channels would likely distribute interference, and how strong the interference effects would be in these cells. The interference supervisor 320 can then check in which of these cells the frequencies of the candidate channels, or the channels adjacent to the candidate channels, are in use. The corresponding sessions can then be further investigated. The interference supervisor 320 can then interrogate the radio quality supervisor 310 in order to find out the quality sensitivity of the relevant to-be-interfered sessions. This sensitivity depends on the requested service and the measured radio quality of the sessions.

The information in the interference impact statistics database 330 can either be entered manually into the database, or automatically updated via measurement reports from MSs or other measurement devices. The information could also be delivered to the database via some other subsystem.

The session quality supervisor 310 is in the exemplary embodiment responsible for monitoring the quality of each ongoing radio session in the system. The session quality supervisor 310 is continuously updated with measurement results from the active MSs, and it keeps track of both requested service quality, e.g. requested amount of net bandwidth and measured physical quality of the radio link, e.g. available net bandwidth for each session.

Figure 4:
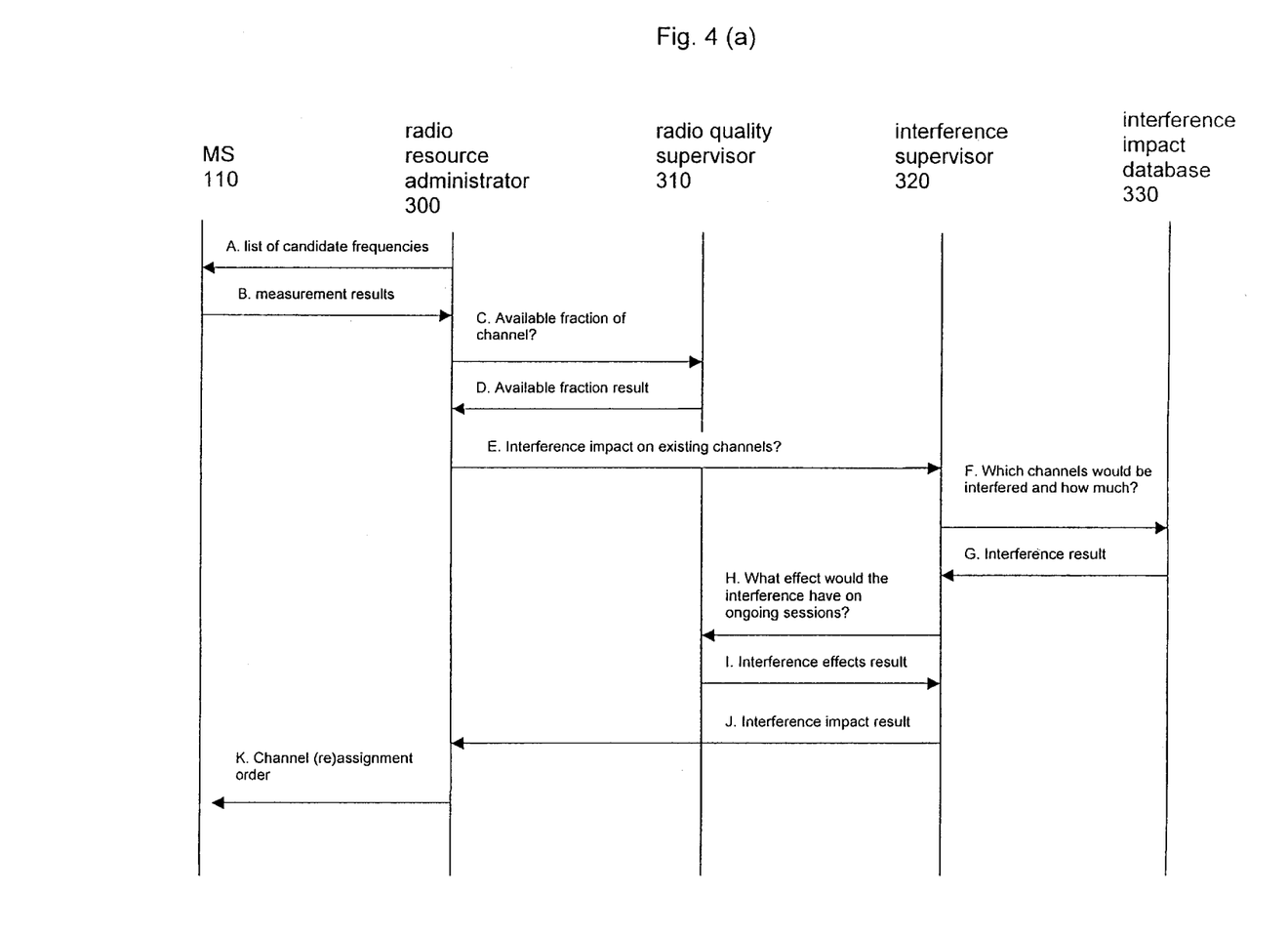

An exemplary channel allocation procedure is shown in FIG. 4. FIG. 4(a) schematically illustrates how the flow of messages in the system takes place, while FIG. 4(b) shows how a Call Record Register (CRR) 400 in the radio resource administrator 300 is filled out as the procedure advances. While the example given concerns an allocation of a GPRS channel, the principles could easily be transferred to any other type of channel allocation.

In FIG. 4(a), the radio resource administrator 300 sends a message A to the MS 110, containing information about the candidate channels on which the MS 110 should perform quality measurements. In connection to this, the radio resource administrator 300 registers the candidate channels in CRR 400 column 1, see FIG. 4(b) (i). After having performed the measurements of the channel quality (see above), the MS 110 then reports the measurement results to the radio resource administrator 300, see FIG. 4(a), message B. Using these measurement results, the radio resource administrator 300 calculates the amount of net bandwidth the candidate channels could provide if the entire gross bandwidth were to be set aside to the allocation in question. This result is entered in CRR 400 column 2, see FIG. 4 (b) (ii). In case of a missing report for a certain candidate channel, the radio resource administrator 300 can either assign a previous measurement result to this channel, or assume that the channel throughput was zero, i.e. that the channel is useless. The information in CRR 400 column 2 is then divided with the net bandwidth requested for the service, which is a piece of information given to the radio resource administrator 300 at an earlier stage, giving the fraction of the channel needed to support the requested service. This result is entered into column 3 of the CRR 400, see FIG. 4(b) (ii). The radio resource administrator 300 then interrogates the radio quality supervisor 310 about what fraction of the candidate channels can be set aside for the channel allocation in question, see FIG. 4(a), message C. The result, message D, is entered into column 4 of the CRR 400, see FIG. 4(b) (iii). If the fraction of a channel which can be set aside is smaller than the fraction needed for the requested service, i.e. the number in column 4 of the CRR 400 is smaller than the number in column 3, then this channel is marked with "Assignment not allowed" in column 6 of the CRR 400.

The radio resource administrator 300 then interrogates the interference supervisor 320 about what the interference effect would be on the already existing radio connections if a radio connection were to be set up on the candidate channels not marked with "Assignment not allowed" in column 6 of the CRR 400. In the request for this information, see message E in FIG. 4(a), the radio resource administrator 300 includes information about what fraction of the respective candidate channels would have to be allocated to the channel allocation in question. The interference supervisor 320 then interrogates the interference impact database 330 about the interference correlation between the candidate channels and the surrounding cells, see message F in FIG. 4(a). The result is returned in message G. The interference supervisor 320 then determines in which of the cells, where interference effects can be expected, the frequencies of the candidate channels are in use for radio transmissions. In order to estimate whether the interference effects on these sessions would be acceptable or not, the radio quality supervisor 310 is interrogated, see message H of FIG. 4(a). This is determined based on which radio quality the sessions presently experience, what quality is needed for the particular session service, how strong the interference correlation is between the on-going session channel and the channel to be allocated, on what effect the interfering candidate channel will be transmitted and how large fraction of the candidate channel will actually be allocated. The result is then sent back to the interference supervisor 320 in message I of FIG. 4(a). The interference supervisor 320 then returns the list of candidate channels to the radio resource administrator 300, see message J, each channel being marked with "interference impact acceptable" or "interference impact not acceptable". The radio resource administrator 300 then enters this information in column 5 of the CRR 400, see FIG. 4(b) (iv). The candidate channels which would yield an unacceptable interference impact on the on-going connections are marked "Assignment not allowed" in column 6. If there are any channels in column 6 not being marked with "Assignment not allowed", one of these is then allocated to the mobile station 110. If there are more than one such channel, which one to allocate can either be chosen randomly, or considering which one is most suitable for the requested service, or has the largest ratio between the available fraction and the required fraction, or reduces the future freedom of action of the system the least, or in any other way. If there is no such channel and the priority of the requested service is high, then there is a possibility for the mobile radio network to choose to close an ongoing session with lower priority in favor of the requesting MS 110. If the radio resource administrator 300 determines that MS 110 should be allocated a channel, a channel assignment order K is sent to the MS 110, see FIG. 4(*a*).

The call record register 400 shown in FIG. 4(*b*) can be designed in a number of different ways. The information gathered can be displayed differently, and other sets of information than what is shown in FIG. 4(*b*) may be stored. For example, the amount of information carrying capacity needed for a requested service may be stored as such instead of as a fraction of channel needed, the impact on existing channels may be graded on a numerical scale, the channel quality may be expressed in another way etc.

In the embodiment described above, the serving channel can be listed in the list of candidate channels in case of an already existing connection. The considerations will however preferably differ between this channel and the other channels in the list. E.g., when considering the impact on already existing connections of setting up a connection on a candidate channel, this impact is already known for the serving channel and is part of the measured signal quality of the existing connections. Hence, the result of consulting the interference impact data-base 330 and the radio quality supervisor 310 for the other candidate channels should be compared with the measured qualities registered in the radio quality supervisor 310. Further, to avoid an excessive amount of hand-overs which would disturb the ongoing session and hence lower the session quality, a positive quality off-set could be given to the serving channel relative the other candidate channels.

The procedure described in FIG. 4 can be continuously repeated until the connection is closed, in order to ensure the quality of the radio connection. FIG. 4(*c*) illustrates, in a flow chart form, how this repetition is performed in the radio resource administrator 300. In the blocks 410 to 435 of the flow chart, the messages A–E and J of FIG. 4 are sent to and from the radio resource administrator 300 and the corresponding tasks are carried out. In block 440, the radio resource administrator 300 determines which (if any) radio channel shall be allocated to the MS 110. In block 445, a comparison is made between the radio channel decided upon and the present serving channel of MS 110. If these are not identical, a channel re-assignment order K is sent to the MS 110 in block 450. The procedure then proceeds to block 455, where the list of candidate channels on which the MS 110 shall measure the radio link quality is selected. If the channels compared in block 445 are identical, the procedure proceeds directly to block 455, without entering block 450. In block 460, a comparison is made between the list selected in step 455 and the previous candidate channel list. If they are identical, the procedure proceeds to block 415, where the radio resource administrator 300 awaits the measurement reports on the radio quality of the candidate channels. If the lists are not identical, block 410 is entered, where the new candidate channel list is sent to the MS 110.

In the above described embodiments of the present invention, the results of the measurements performed by the MS are sent to the mobile radio network, where the decision on which candidate channel to allocate to the connection is made. Another possible embodiment of the present invention could be to send the information known by the mobile radio network (e.g. the estimated impact on, and the requested and measured quality of, already existing connections) to the MS and have the logic for making the decision in the MS. In yet another embodiment, the measurements could be based on the quality of the uplink radio channel instead of on the downlink channel, measurements being made on the uplink channels by the BTSs, in which case all the information would be known by the mobile radio network.

Figure 5:
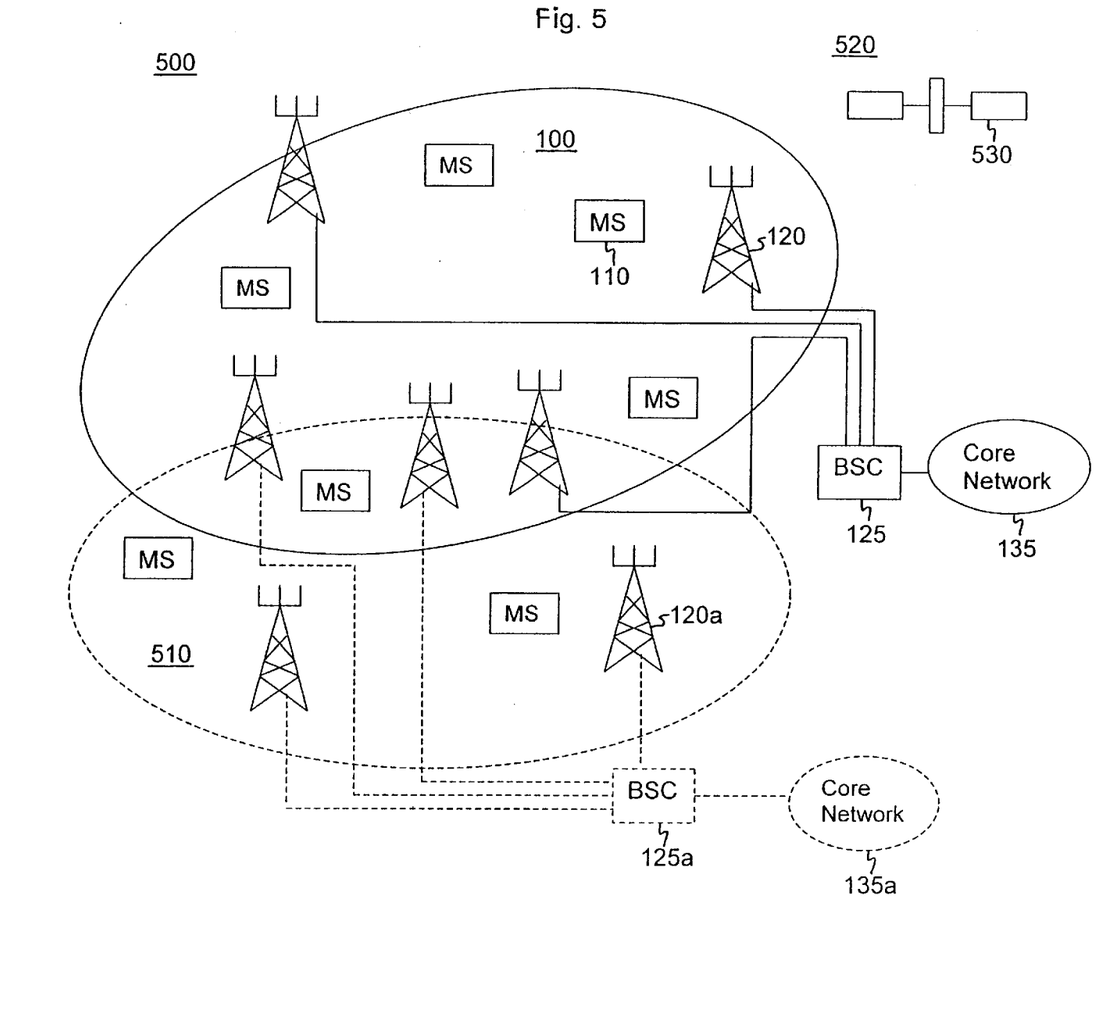
FIG. 5 schematically illustrates a mobile radio system comprising three independent networks, one which is based on satellite transmission.

In an environment where there are more than one mobile radio network available, the method and apparatus described above could be used for selecting the most suitable channel considering the channels of more than one mobile radio network. An example of such environment is shown in FIG. 5. A mobile radio system 500 comprises two independent mobile radio networks, mobile radio network 100 and mobile radio network 510, whose coverage areas partly overlap, as well as a mobile radio network 520 for mobile radio communication based on satellite communication, of which an exemplary satellite 530 is shown. The mobile radio network entities of mobile radio network 510 are marked with an "a", e.g. BSC 125*a*. The mobile radio networks 100 and 510 could be e.g. a GSM/GPRS network and a DAMPS network, or an analog Nordic Mobile Telephone (NMT) network and a wide-band Code Division Multiple Access (CDMA) Universal Mobile Telephony System (UMTS) network, or any other combination of mobile radio networks. A mobile station situated within the coverage areas of both mobile radio network 100 and mobile radio network 510 as well as within the coverage area of the satellite based mobile radio network 520 could have radio channels from any of the three mobile radio networks on the list of candidate channels.

Although the embodiments of the present invention described above have been described in the terms of a TDMA system, the teachings of the invention can also be applied to a CDMA system. The allocation of different channels by allocation of different frequencies and time slots in a TDMA system could then correspond to the allocation of different codes in the CDMA system, or to whatever feature defines a basic physical channel in the system.

One skilled in the art will appreciate that the present invention is not limited to the embodiments disclosed in the accompanying drawings and the foregoing detailed description, which are presented for purposes of illustration only, but it can be implemented in a number of different ways, and it is defined by the following claims.

What is claimed is:

1. A method of determining a radio channel for a mobile station for communicating via a service in a mobile radio system, the mobile radio system having first and second base transceiver stations, each base station having a corresponding radio coverage area and a plurality of radio channels, comprising:

storing in memory interference impact information correlating an interference estimate that transmitting on each of plural candidate radio channels in the first base station coverage area would have on radio communications in the second base station coverage area;

selecting at least one candidate radio channel among the radio channels corresponding to the first base station;

measuring the quality of the at least one candidate radio channel, resulting in at least one radio channel quality measure;

based on the stored memory interference impact information, estimating for the at least one candidate radio channel an interference effect on one or more existing radio connections in the second base station coverage area of establishing a radio connection on the at least one candidate radio channel, resulting in at least one interference estimate; and determining one of the radio channels for communication based on the at least one radio channel quality measure and the at least one interference estimate.

2. The method according to claim 1, wherein the step of measuring the quality is performed by the mobile station; and the at least one candidate radio channel includes at least one downlink radio channel.

3. The method according to claim 2, further comprising:

sending the at least one radio channel quality measure from the mobile station to the mobile radio system, and wherein the step of determining takes place at the mobile radio system.

4. The method according to claim 3, further comprising:

measuring the path loss between one of the first and second base transceiver stations and the radio coverage area corresponding to another one of the first and second base transceiver stations.

5. The method according to claim 3, wherein the interference impact information is generated using a cell-to-cell interdependency matrix corresponding to the first and second radio coverage areas.

6. The method according to claim 3, wherein the step of measuring the quality further comprises analyzing soft values in the mobile station.

7. The method according to claim 3, wherein the step of measuring the quality further comprises the steps of measuring the interference during idle time slots and measuring the carrier signal strength during active time slots.

8. The method according to claim 1, further comprising:

comparing the at least one radio channel quality measure with a quality requested by the service resulting in at least one quality comparison result; and wherein the step of determining includes determining the one radio channel based on the at least one quality comparison result.

9. The method in claim 1, wherein the interference impact information is stored in an interference impact statistics database.

10. A method of determining a radio channel for a mobile station for communicating via a service in a mobile radio system, the mobile radio system having at least two base transceiver stations with corresponding base transceiver station radio coverage areas and a plurality of radio channels, comprising:

selecting at least one candidate radio channel among the radio channels;

measuring the quality of the at least one candidate radio channel, resulting in at least one radio channel quality measure;

estimating for the at least one candidate radio channel an interference effect on one or more existing radio connections of establishing a radio connection on the at least one candidate radio channel, resulting in at least one interference estimate; and determining one of the radio channels for communication based on the at least one radio channel quality measure and the at least one interference estimate, the method further comprising:

comparing the at least one radio channel quality measure with a quality requested by the service resulting in at least one quality comparison result;

wherein the step of determining includes determining the one radio channel based on the at least one quality comparison result;

wherein the at least one quality measure is expressed in an amount of net bandwidth, and the quality requested by the service is expressed in a requested amount of net bandwidth;

wherein the step of comparing includes using information regarding existing usage of the frequency of the at least one candidate radio channel together with the total amount of net bandwidth on the at least one candidate radio channel to obtain an amount of available net bandwidth; and wherein the at least one quality comparison result includes a result of the comparison between the requested amount of net bandwidth and the amount of available net bandwidth.

11. The method according to claim 1 wherein the mobile radio system includes at least a first mobile radio network having a plurality of radio channels and a second mobile radio network having a plurality of radio channels, the coverage area of the first mobile radio network at least partly overlapped by the coverage area of the second mobile radio network;

wherein the at least one candidate radio channel selected in the step of selecting is selected among the radio channels of the first mobile radio network and the second mobile radio network; and wherein the step of estimating includes estimating interference effects on existing radio connections in the first mobile radio network and in the second mobile radio network.

12. A method of determining a radio channel for a mobile station for communicating via a service in a cellular mobile radio system, the mobile radio system having first and second cells each cell including a base station and a plurality of radio channels, comprising:

generating estimated interference impact statistics associated with an impact that transmitting over each of the plurality of radio channels in the first cell would have on radio communications in the second cell;

storing the estimated interference impact statistics in a memory;

selecting a candidate radio channel among the radio channels in the first cell;

measuring the quality of the selected candidate radio channel, resulting in a radio channel quality measure;

using the stored estimated interference impact statistics, estimating for the selected candidate radio channel an interference effect on one or more existing radio connections in the second cell of establishing a radio connection on the selected candidate radio channel, resulting in at least one interference estimate; and determining one of the radio channels in the first cell for communication based on the radio channel quality measure and the interference estimate.

13. The method according to claim 12, wherein measuring the quality is performed by the mobile station, and the selected candidate radio channel includes a downlink radio channel.

14. The method according to claim 12, wherein the step of generating includes measuring a path loss between the base stations in the first and second cells.

15. The method according to claim 12, wherein the step of generating is performed using a cell-to-cell interdependency matrix which is stored in the memory.

16. The method according to claim 12, wherein the step of measuring the quality further comprises analyzing soft values in the mobile station.

17. The method according to claim 12, further comprising:
   comparing the at least one radio channel quality measure with a quality requested by the service resulting in at least one quality comparison result; and
   wherein the step of determining includes determining the one radio channel based on the at least one quality comparison result.

18. The method according to claim 12, wherein the cellular mobile radio system includes a first mobile radio network having the first cell and a second mobile radio network having the second cell, and
   wherein the step of generating includes generating estimated interference impact statistics associated with an impact that transmitting over each of the plurality of radio channels in the first cell in the first mobile radio network would have on radio communications in the second cell in the second mobile radio network.

* * * * *